United States Patent [19]

Kreft et al.

[11] Patent Number: 5,244,383
[45] Date of Patent: Sep. 14, 1993

[54] METHOD AND APPARATUS FOR REDUCING THE CIRCULATION OF SALTS PARTICULARLY IN CEMENT KILNS

[75] Inventors: Wilfried Kreft; Ludger Günnewig, both of Ennigerloh, Fed. Rep. of Germany

[73] Assignee: O&K Orenstein & Koppel AG, Berlin, Fed. Rep. of Germany

[21] Appl. No.: 655,449

[22] PCT Filed: Jul. 27, 1989

[86] PCT No.: PCT/EP89/00885

§ 371 Date: Mar. 4, 1991

§ 102(e) Date: Mar. 4, 1991

[87] PCT Pub. No.: WO90/02915

PCT Pub. Date: Mar. 22, 1990

[30] Foreign Application Priority Data

Sep. 2, 1988 [DE] Fed. Rep. of Germany ....... 3829853

[51] Int. Cl.$^5$ .............................................. F27B 7/02
[52] U.S. Cl. ........................................ 432/14; 432/106
[58] Field of Search .................... 432/106, 103, 58, 14

[56] References Cited

U.S. PATENT DOCUMENTS

| | | | |
|---|---|---|---|
| 3,288,450 | 11/1966 | Bade | 432/103 |
| 3,923,536 | 12/1975 | Kobayashi . | |
| 4,286,993 | 9/1981 | Lovichi . | |
| 4,514,170 | 4/1985 | Kupper | 432/106 |
| 4,541,245 | 9/1985 | Becker et al. . | |
| 4,695,325 | 9/1987 | Enkegaard . | |
| 4,997,363 | 3/1991 | Hundebol | 432/14 |
| 5,026,275 | 6/1991 | Hundebol | 432/14 |

FOREIGN PATENT DOCUMENTS

| | | |
|---|---|---|
| 0138057 | 4/1985 | European Pat. Off. . |
| 0143395 | 5/1985 | European Pat. Off. . |
| 0111033 | 6/1985 | European Pat. Off. . |
| 0154281 | 9/1985 | European Pat. Off. . |
| 1292319 | 4/1969 | Fed. Rep. of Germany . |
| 2201765 | 8/1972 | Fed. Rep. of Germany . |
| 2621219 | 12/1976 | Fed. Rep. of Germany . |
| 2716454 | 8/1979 | Fed. Rep. of Germany . |
| 2446266 | 8/1980 | Fed. Rep. of Germany . |
| 2630907C2 | 7/1984 | Fed. Rep. of Germany . |
| 2235890 | 1/1975 | France . |

OTHER PUBLICATIONS

H. Ramesohl, "Probleme der Elektroentstaubung hochalkalichloridhaltiger Abgase aus Teilgasabzügen bei Wärmetauscher-Trockendrehöfen", Zement-Kalk-Gips, Nr. May 1978, pp. 236–238.
Proceedings of VDZ-Kongress '71; H. Schlüter, pp. 172–174 (with English translation of Summary).
Reprint of "Die Chemische Produktion", S-604d, Jan. to Feb. 1979 S. 20–23 (with English translation of Summary).

Primary Examiner—Henry C. Yuen
Attorney, Agent, or Firm—Spencer, Frank & Schneider

[57] ABSTRACT

A method and arrangement for reducing the circulation of salts in a cement kiln in which a raw meal heat exchanger feeds material to the kiln. A partial gas stream charged with harmful substances is removed from the kiln through a bypass conduit. The partial gas stream is subjected to a multi-stage process of removing dust. This process includes passing the partial gas stream through a first dust separating stage, followed by returning an uncooled dust component of the partial gas stream to the kiln and cooling the remaining portion of the partial gas stream. The cooled remaining portion of the partial gas stream is subjected to a further dust separating process, and thereafter passed through a further bypass conduit to a location of the raw meal exchanger, which location has a temperature at approximately the same level as the temperature of the remaining portion of the partial gas stream entering the further bypass conduit following the further dust separating process.

6 Claims, 2 Drawing Sheets

METHOD AND APPARATUS FOR REDUCING THE CIRCULATION OF SALTS PARTICULARLY IN CEMENT KILNS

BACKGROUND OF THE INVENTION

The invention relates to a method of reducing the circulation of salts, particularly in cement kilns, wherein a partial gas stream charged with harmful substances is removed from the kiln through a bypass conduit; these kiln gases are then cooled and returned to the manufacturing process.

Substances employed in the production of cement contain ancillary components such as alkalis, sulphur, and chlorine, which partially evaporate in the region of the sintering zone and establish circulations that considerably interfere with kiln operation due to the formation of deposits.

These problems occur in particular if, for example, waste materials are employed as substitute raw materials and fuels. These substances may contain large amounts of the above-mentioned ancillary components so that it is necessary to reduce the circulation of salts in such cases. In the prior art, bypass systems are generally employed for this purpose which operate according to the following principle:

removal of a partial gas stream at the point of transition from the kiln to the calcinator or raw meal heat exchanger;
cooling of these kiln gases with fresh air to about 400° C.;
further cooling of the gases with water to about 150° C.;
precipitation of the dust particles in a filter and removal of the dust from the calcination process.

The drawbacks of the application of this technique are the increase in the heat requirement of the system and losses of raw material created by the development of dust. A particular drawback is the installation of such bypass devices in furnace systems which circulate large amounts of dust, as is the case, for example, for heat exchangers operating according to the shaft pre-heating principle.

European Application EP-A-0,154,281 discloses a method for producing cement and an apparatus operating according to the method in which raw material is fired into clinker, the clinker is cooled and ground into a final meal-like cement product. Substances ineterfering with the calcination process, such as alkalis, chlorides and/or heavy metals, are branched off from the calcination process by means of a partial gas extraction (bypass) at least until they reach a point of no longer being harmful. With the addition of additives, an intermediate product is produced from the clinker, with the gas obtained in the partial gas extraction and/or substances contained therein being introduced at least in part into the intermediate product. The intermediate product is ground into the final cement product. As already mentioned above, the branching off of a partial stream of gas ultimately does not prevent the development of salt circulation, rather the resulting intermediate products and their contaminants are integrated in the end product. Depending on the type of cement, this measure may result in problems during further processing.

European Application EP-A-0,138,057 discloses a method, and a system operating according to the method, for producing cement clinker that is low in harmful substances, particularly low in alkalis. Here, the reaction gas stream and the exhaust gas stream of the clinker stage are combined into a single suspension gas stream before being introduced into the lowermost heat exchanger zone of the pre-heating stage. This method is also unable to prevent the effect of salt circulation formation.

U.S. Pat. No. 3,288,450 discloses a method as well as a system for the production of cement. The kiln exhaust gas is initially introduced into a cyclone. By way of a further conduit and a further cyclone, the exhaust gas stream reaches a stack pre-heater which cooperates with further cyclone stages. The material is charged in in the upper region of the stack and passes through the respective cyclone stages where it is to be pre-heated before it is introduced into the region of the rotary kiln. The dust laden exhaust gas stream is conducted through an electrofilter before it is discharged to the ambient air. From the electrofilter, a conduit leads to the part of the kiln exhaust gas conduit disposed between the first two cyclone stages upstream of the stack. By way of a further conduit, cold powdered material may be added from a container. By adding the materials from the electrofilter and/or the container into the waste gas stream, the latter is cooled suddenly, with salt compounds condensing or subliming, respectively, on the dust or material particles. This dust is separated in the first cyclone stage and fed into the rotary kiln. The drawback noted in connection with this process is that the entire exhaust gas stream is cooled suddenly which has an adverse effect on the subsequent precalcining process and on the pre-heating of the raw materials since a sufficient temperature level no longer exists. The result of this is, on the one hand, unsatisfactory precalcination and an increased heat requirement of the kiln system connected therewith.

SUMMARY OF THE INVENTION

It is the object of the invention to design a method as well as an apparatus for the reduction of salt circulation, particularly in cement kilns which substantially avoids the mentioned drawbacks of a bypass system and meets process technology requirements.

This is accomplished with respect to the method by a multi-stage process of dust separation from the partial gas stream, with the gases being cooled between the processes and, subsequent to the removal of the dust, being returned to the location of the raw meal heat exchanger which preferably has the same temperature level as the bypass conduit subsequent to the dust separation process.

Preferably, a two-stage dust separation process is employed in which the branched-off partial gas stream is initially introduced into a preliminary separator; after the preliminary dust separation, the gases are cooled with air to about 600° C., and the second stage of the dust separation takes place in a cyclone designed for a high degree of precipitation and separation. According to a further aspect of the invention, the dust removed from the preliminary separation stage and from the cyclone is returned to the sintering zone.

Due to the spontaneous cooling of the gases with fresh air to approximately 600° C., the salt compounds condense and sublimate on the dust particles. A specially designed high performance cyclone exhibiting a high degree of precipitation and separation of fine particles, takes care of an effective dust separation. In this way, the following advantages result for the proposed bypass concept:
low dust losses due to dust separation in at least two stages;
low heat requirement of the kiln system since the return of the gas into the heat exchanger results in the utilization of the heat to pre-heat the raw meal.

In contrast to the prior art, this inventive solution results in high efficiency with a simultaneously high economy.

An apparatus for reducing the circulation of salts is characterized in that bypass conduit is provided in the region of the kiln inlet of the calcination system and is connected with a preliminary dust separator. The preliminary dust separator is connected by way of a conduit with a high performance cyclone and fresh air can be introduced in the region of this conduit. According to a further feature of the invention the high performance cyclone is connected by way of a further bypass conduit with the raw meal heat exchanger. Preferably, the bypass dust is returned into the inlet region of the calcination system.

The invention is illustrated in the drawing figures for one embodiment thereof and will be described as follows:

DESCRIPTION OF THE PREFERRED EMBODIMENTS

Figure 1:
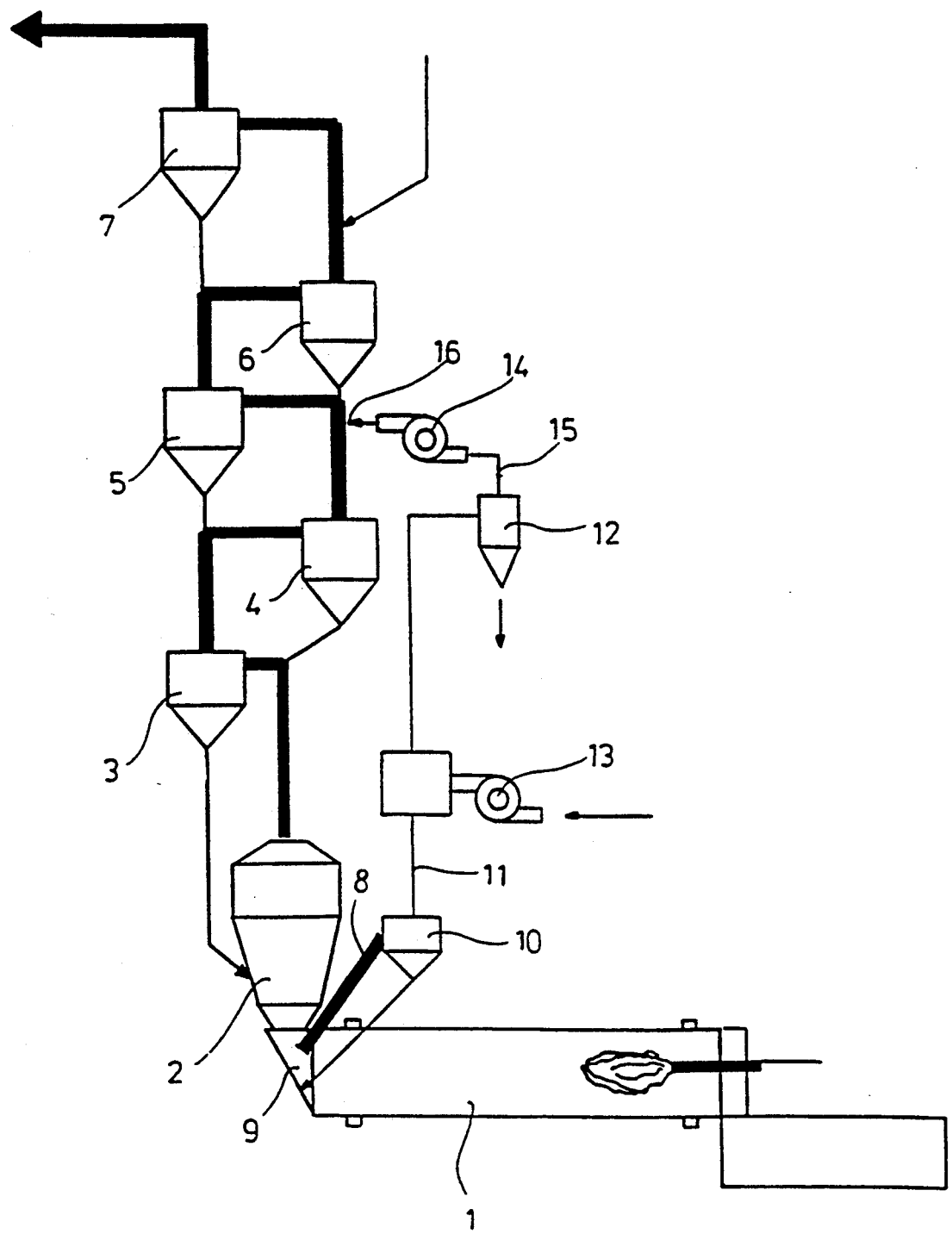
FIG. 1 is a function diagram which shows a cement kiln with a bypass system according to the invention.

FIG. 1 shows the inventive bypass system in the form of a function diagram. Shown are a rotary kiln 1 as a sintering stage, calcinating stage 2 as well as a preliminary heating stage constituted of several heat exchangers 3 to 7. By way of a bypass conduit 8, a partial gas stream is removed from rotary kiln 1 in the region of its inlet region 9. This partial gas stream is fed to a preliminary dust separator 10, with the already separated dust particles being returned to the calcination process at inlet region 9. By way of a conduit 11, the partial gas stream is introduced into a high preformance cyclone 12 and fresh air is introduced in the region of this conduit 11 by means of blowers 13 or the like. The partial gas stream is cooled suddenly to about 600° C., during which the salt compounds condense or sublime, respectively, on the dust particles. Dust separated in high performance cyclone 12 is also returned to the calcination process in region 9 of kiln 1. The partial gas stream which still has a temperature of about 600° C. is returned by means of a blower 14 into the region of the preliminary heating stage. For this purpose, a further conduit 15 is provided which is brought to the location 16 of the raw meal heat exchanger where the gas temperature is approximately 600° C.

Figure 2:
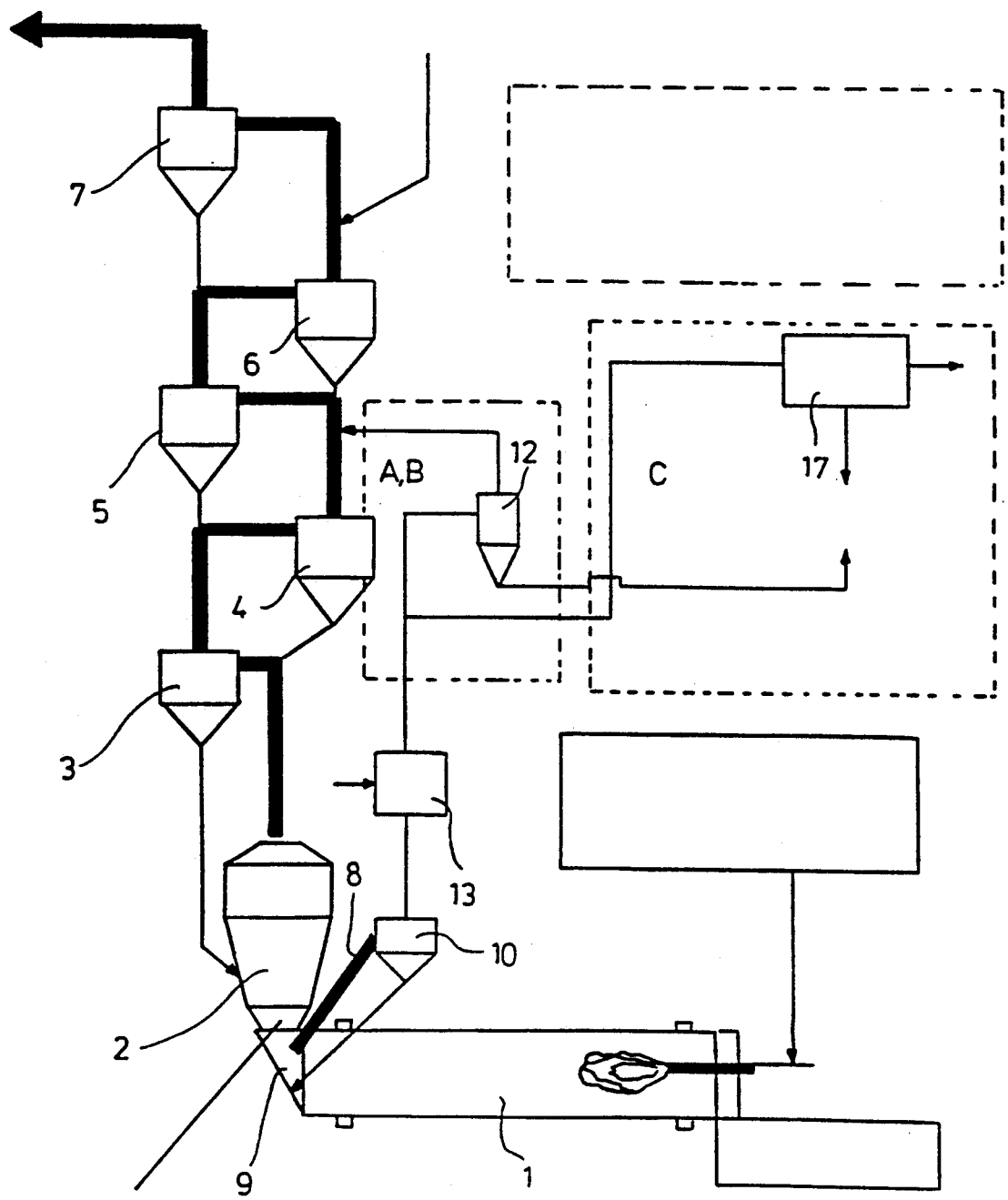
FIG. 2 shows three different variations of the bypass illustrated in FIG. 1.

FIG. 2, in the form of a function diagram, essentially shows the same system as FIG. 1, with the difference that here three bypass variations are shown. The three bypass variations can be described as follows:

A bypass gases are removed and cooled with air to about 600° C. The dust is removed in a high performance cyclone 12 and the cyclone exhaust gases are returned to the heat exchanger;

B similar to A but a preliminary separator 10 is added to keep the quantity of bypass dust at a minimum;

C after preliminary separation in a cyclone 12, cooling with air takes place to about 350° C. and dust is removed from the gases by means of a dust removal filter 17. Thus, the gases are no longer returned into the heat exchanger.

A comparison of bypass variations A to C will now be made by way of a table.

| Comparison of the Bypass Variations (with reference to 5% Bypass) | | | |
|---|---|---|---|
| Version | A | B | C |
| heat losses kcal/kg clinker | 31 | 24 | 43 |
| quantity of fresh air $Nm^3$/kg clinker | 0.094 | 0.082 | 0.214 |
| quantity of mixed gases $Nm^3$/kg clinker | 0.165 | 0.152 | 0.284 |
| temperature of the mixed gases °C. | 600 | 600 | 350 |
| bypass dust to the cement mill t/h | 2.76 | 1.35 | 1.53 |
| bypass effectiveness % | 90 | 80 | 100 |
| chlorine content in the hot meal % | 1.56 | 1.75 | 1.40 |
| power requirement for fans % | 100 | 92 | 172 |
| complexity of the system | low | low | high |

Examination of the values demonstrates a clear superiority of variation B:
small quantities of gas;
small quantities of dust;
low complexity;
chlorine content in the hot meal <2%, that is, a non-critical concentration with respect to the danger of clogging;
low operating costs.

The cost/effectiveness ratio is very unfavorable for the dust removal filter version.

We claim:
1. Method for reducing the circulation of salts in a cement kiln in which a raw meal heat exchanger feeds material to the kiln, comprising:
removing a partial gas stream charged with harmful substances from the kiln through a bypass conduit;
subjecting the partial gas stream to a multi-stage process of removing dust, including:
passing the partial gas stream through a first dust separating stage;
followed by returning an uncooled dust component of the partial gas stream from the first dust separating stage to the kiln and cooling the remaining portion of the partial gas stream;
subjecting the cooled remaining portion of the partial gas stream to a further dust separating process; and
thereafter passing the remaining portion of the partial gas stream through a further bypass conduit to a location of the raw meal heat exchanger, which location has a temperature at approximately the same level as the temperature of the remaining portion of the partial gas stream entering the further bypass conduit following the further dust separating process.

2. A method according to claim 1, wherein said multi-stage dust separating process is a two-stage dust separating process so that said step of subjecting the cooled remaining portion of the partial gas stream to a further dust separating process includes passing the cooled remaining portion of the partial gas stream through a second dust separating stage which is connected to the second bypass conduit.

3. A method according to claim 2, wherein said first dust separating stage comprises a preliminary dust separator, said cooling step includes cooling the remaining portion of the partial gas stream with air to about 600°, and said second dust separating stage comprises a cyclone configured for a high degree of precipitation and separation.

4. A method according to claim 1, wherein dust separated from said partial gas stream is returned to an inlet region of the kiln.

5. A device for reducing the circulation of salt in a cement kiln, comprising:
   a calcination device including a preliminary heating stage for heating raw meal, a calcination stage receiving the raw meal from the preliminary heating stage and a sintering stage having an inlet region communicating with the calcination stage;
   a bypass conduit communicating with the inlet region of said sintering stage for removal of a partial gas stream;
   a preliminary dust separator connected to said bypass conduit for removing dust from the partial gas stream;
   a high performance cyclone;
   a connecting conduit connecting the preliminary dust separator with said high performance cyclone;
   means for introducing fresh air into said connecting conduit for cooling the partial gas stream; and
   a second bypass conduit connecting said high performance cyclone to said preliminary heating stage.

6. A device according to claim 5, and further including means for returning dust removed from the partial gas stream to the inlet region of said sintering stage.

* * * * *